US012749511B2

(12) United States Patent
Zi et al.

(10) Patent No.: US 12,749,511 B2
(45) Date of Patent: Sep. 29, 2026

(54) PLAYBACK CROSSTALK DETECTION METHOD, DEVICE, AND STORAGE MEDIUM

(71) Applicants: DOUYIN VISION CO., LTD., Beijing (CN); BEIJING ZITIAO NETWORK TECHNOLOGY CO., LTD., Beijing (CN)

(72) Inventors: Xuefei Zi, Beijing (CN); Ren Chen, Beijing (CN); Xiaomeng Li, Beijing (CN); Jiahao Zhang, Beijing (CN); Qianqian Liang, Beijing (CN); Baowang Chi, Beijing (CN); Zhen Cheng, Beijing (CN); Qing Huang, Beijing (CN); Tianze Yu, Beijing (CN)

(73) Assignees: DOUYIN VISION CO., LTD., Beijing (CN); BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/874,782

(22) PCT Filed: Nov. 7, 2023

(86) PCT No.: PCT/CN2023/130170
§ 371 (c)(1),
(2) Date: Dec. 13, 2024

(87) PCT Pub. No.: WO2024/099311
PCT Pub. Date: May 16, 2024

(65) Prior Publication Data
US 2026/0004815 A1 Jan. 1, 2026

(30) Foreign Application Priority Data
Nov. 7, 2022 (CN) ........................ 202211385358.1

(51) Int. Cl.
*G11B 27/36* (2006.01)
*H04N 21/442* (2011.01)
*H04N 21/658* (2011.01)

(52) U.S. Cl.
CPC ........... *G11B 27/36* (2013.01); *H04N 21/442* (2013.01); *H04N 21/658* (2013.01)

(58) Field of Classification Search
CPC ..... G11B 27/36; H04N 21/442; H04N 21/658
See application file for complete search history.

(56) References Cited

U.S. PATENT DOCUMENTS

2002/0060958 A1* 5/2002 Ando .................. G11B 7/1378
2007/0006082 A1 1/2007 Potter
(Continued)

FOREIGN PATENT DOCUMENTS

CN 1633210 A 6/2005
CN 106155828 A 11/2016
(Continued)

OTHER PUBLICATIONS

ISA China National Intellectual Property Administration, International Search Report Issued in Application No. PCT/CN2023/130170, Jan. 24, 2024, WIPO, 13 pages.
(Continued)

*Primary Examiner* — Thai Q Tran
*Assistant Examiner* — Jose M Mesa
(74) *Attorney, Agent, or Firm* — Alleman Hall LLP

(57) ABSTRACT

A method and apparatus for detecting playing crosstalk, device and storage medium are provided, and the method includes: performing playing a crosstalk detection according to a playing state switching operation of at least one player instance; and in response to a detection result being that there is playing crosstalk, recording abnormal playing information about a target player instance which is currently in a
(Continued)

playing state, and reporting the abnormal playing information to a server, where the abnormal playing information includes player view tree information; and the player view tree information is used for determining a service scene page where the player instance is located.

18 Claims, 4 Drawing Sheets

(56) References Cited

U.S. PATENT DOCUMENTS

| | | | | |
|---|---|---|---|---|
| 2008/0145031 | A1* | 6/2008 | Tanaka | G11B 27/005<br>386/E5.052 |
| 2022/0308826 | A1 | 9/2022 | Huang et al. | |
| 2024/0196026 | A1* | 6/2024 | Zink | H04N 21/234345 |

FOREIGN PATENT DOCUMENTS

| | | | |
|---|---|---|---|
| CN | 106303753 | A | 1/2017 |
| CN | 106303821 | A | 1/2017 |
| CN | 107211062 | A | 9/2017 |
| CN | 108882041 | A | 11/2018 |
| CN | 106954097 | B | 8/2019 |
| CN | 110401877 | A | 11/2019 |
| CN | 110718237 | A | 1/2020 |
| CN | 111263233 | A | 6/2020 |
| CN | 112235063 | A | 1/2021 |
| CN | 114286184 | A | 4/2022 |
| CN | 115019826 | A | 9/2022 |
| CN | 115857865 | A | 3/2023 |

OTHER PUBLICATIONS

China National Intellectual Property Administration, Office Action and Search Report Issued in Application No. 202211385358.1, Jun. 12, 2026, 12 pages.

* cited by examiner

PLAYBACK CROSSTALK DETECTION METHOD, DEVICE, AND STORAGE MEDIUM

CROSS-REFERENCE TO RELATED APPLICATIONS

The present application is a U.S. national stage application of International Patent Application No. PCT/CN2023/130170, filed on Nov. 7, 2023, which claims the priority to Chinese Patent Application No. 202211385358.1, filed on Nov. 7, 2022, the entire disclosure of which is incorporated herein by reference as portion of the present application.

TECHNICAL FIELD

Embodiments of the present disclosure relate to a method and apparatus for detecting playing crosstalk, device and storage medium.

BACKGROUND

Playing crosstalk refers to an abnormal where we are disturbed by other unknown video sounds during normal viewing of the video. In recent years, crosstalk anomaly experience has become one of the most serious problems in video applications, easily leading to a large amount of user feedback.

When the user's crosstalk feedback is received, the user's playing behavior may only be analyzed through the user's log, which lacks the ability of crosstalk detection and judgment of the causes of crosstalk, and makes it difficult to troubleshoot crosstalk problems.

SUMMARY

The present disclosure provides a method and apparatus for detecting playing crosstalk, device and storage medium to achieve playback crosstalk detection function and quickly locate service scene page that generates crosstalk.

In a first aspect, the embodiments of the present disclosure provide a method for detecting playing crosstalk, applicable in a client, including:

performing a playing crosstalk detection according to a playing state switching operation of at least one player instance; and in response to a detection result being that there is playing crosstalk, recording abnormal playing information about a target player instance which is currently in a playing state, and reporting the abnormal playing information to a server, in which the abnormal playing information includes player view tree information; and the player view tree information is used for determining a service scene page where the player instance is located.

In a second aspect, the embodiments of the present disclosure further provide a method for detecting playing crosstalk, applicable in a server, including:

receiving abnormal playing information about a player instance reported by a client, and storing the abnormal playing information; in which the abnormal playing information includes player view tree information;

in response to a playing crosstalk feedback operation of a user, querying whether there is the abnormal playing information matching the playing crosstalk feedback operation; and in response an existence of the abnormal playing information matching the playing crosstalk feedback operation, determining a service scene page where a player instance generating playing crosstalk is located according to the player view tree information in the abnormal playing information.

In a third aspect, the embodiments of the present disclosure further provide an apparatus for detecting playing crosstalk, applicable in a client, including:

a detection module, configured to perform a playing crosstalk detection according to a playing state switching operation of at least one player instance; and a sending module, configured to, in response to a detection result being that there is playing crosstalk, record abnormal playing information about a target player instance which is currently in a playing state, and report the abnormal playing information to a server, in which the abnormal playing information includes player view tree information; and the player view tree information is used for determining a service scene page where the player instance is located.

In a fourth aspect, the embodiments of the present disclosure further provide apparatus for detecting playing crosstalk, applicable in a server, including:

a receiving module, configured to receive abnormal playing information about a player instance reported by a client, and store the abnormal playing information; in which the abnormal playing information includes player view tree information;

a query module configured to, in response to a playing crosstalk feedback operation of a user, query whether there is the abnormal playing information matching the playing crosstalk feedback operation; and an abnormality locating module configured to, in response an existence of the abnormal playing information matching the playing crosstalk feedback operation, determine a service scene page where a target player instance generating playing crosstalk is located according to the player view tree information in the abnormal playing information.

In a fifth aspect, the embodiments of the present disclosure further provide an electronic device, including:

one or more processors; and a storage apparatus for storing one or more programs, in which when the one or more programs are executed by the one or more processors, the one or more processors implement the method for detecting playing crosstalk according to the embodiments of the present disclosure.

In a sixth aspect, the embodiments of the present disclosure further provide a storage medium containing computer-executable instructions, in which the computer-executable instructions, when executed by a computer processor, perform the method for detecting playing crosstalk according to the embodiments of the present disclosure.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

DETAILED DESCRIPTION

Figure 1:
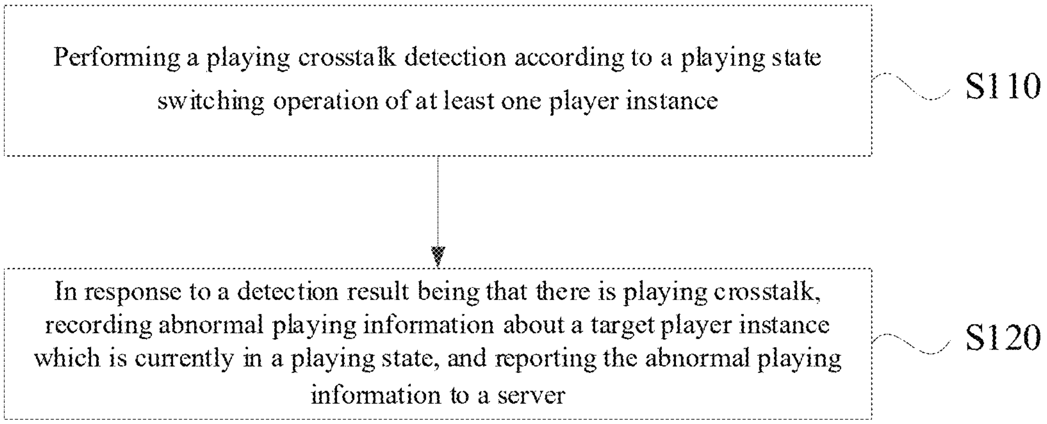
FIG. 1 is a schematic flow diagram of a method for detecting playing crosstalk according to an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of the messages or information exchanged between a plurality of apparatuses in the embodiments of the present disclosure are for illustrative purposes only and are not intended to limit the scope of these messages or information.

It may be understood that before using the technical solutions disclosed in the embodiments of the present disclosure, it is necessary to inform user(s) the types, using scope, and using scenarios of personal information involved in the present disclosure according to relevant laws and regulations in an appropriate manner and obtain the authorization of the user(s).

For example, in response to receiving a user's active request, a prompt message is sent to the user to clearly remind the user that the requested operation will require acquiring and using the user's personal information. Thus, users can selectively choose whether to provide personal information to the software or hardware such as an electronic device, an application, a server, or a storage medium that perform the operations of the technical solutions of the present disclosure according to the prompt message.

As an optional but non-restrictive implementation, in response to receiving the user's active request, sending the prompt message to the user may be done in the form of a pop-up window, where the prompt message may be presented in text. In addition, the pop-up window may further carry a selection control for users to choose between "agree" or "disagree" to provide the personal information to an electronic device.

It may be understood that the above-mentioned processes of informing and acquiring user authorization are only illustrative and do not limit the embodiments of the present disclosure. Other methods that comply with relevant laws and regulations may also be applied to the embodiments of the present disclosure.

It may be understood that the data involved in the technical solutions (including but not limited to the data itself, data acquisition or use) should comply with the requirements of corresponding laws, regulations and relevant provisions.

FIG. 1 is a schematic flow diagram of a method for detecting playing crosstalk according to an embodiment of the present disclosure, and the embodiment of the present disclosure is applicable to the case where a playing crosstalk detection is performed on a player instance and playing information about the player instance associated with crosstalk is collected. The method may be executed by an apparatus for detecting playing crosstalk, and the apparatus may be realized in the form of software and/or hardware, and optionally, may be realized by an electronic device, and the electronic device may be a client device such as a mobile terminal, a PC, etc. Specifically, as shown in FIG. 1, the method includes:

S110: performing a playing crosstalk detection according to a playing state switching operation of at least one player instance.

In this embodiment, the playing state switching operation may include that: the player enters the playing state and the player instance exits the playing state. Since the playing state switching operation of the player instance will affect the quantity of player instances which are currently in the playing state simultaneously, namely, affecting whether there is playing crosstalk currently, the playing crosstalk detection may be performed according to the playing state switching operation of the at least one player instance.

Optionally, the performing the playing crosstalk detection according to the playing state switching operation of at least one player instance includes: updating a player instance list according to the playing state switching operation of the at least one player instance; and in response to a player instance entering the playing state, performing the playing crosstalk detection according to the player instance list.

In this embodiment, in order to manage the player instance(s) currently in the playing state and quickly count the total quantity of player instances simultaneously in the playing state, the player instance list is established for storing attribute information about the player instance currently in the playing state, such as an identity identification of the player instance, a service scene identification, etc. Considering that when the player instance enters the playing state, a new playing crosstalk may be caused, and when the player instance exits the playing state, the playing crosstalk can only be eliminated, if there is the playing state switching operation of the player instance to enter the playing state, the playing crosstalk detection is performed according to the information stored in the player instance list.

Optionally, the updating the player instance list according to the playing state switching operation of the at least one player instance includes: in response to the player instance exiting the playing state, deleting attribute information about the player instance from the player instance list; in response to the player instance entering the playing state, adding the attribute information of the player instance to the player instance list.

In this embodiment, when the player instance enters a playing state in preparation for playing a new video, the attribute information of the player instance may be added to the player instance list for recording. When the playing of the video currently being played in the player instance ends and the player instance exits the playing state, an entry matching the identity identification of the player instance, namely, the attribute information about the player instance, may be searched in the player instance list and deleted.

Optionally, the performing the playing crosstalk detection according to the player instance list includes: in response to the attribute information about at least two player instances being contained in the player instance list, determining that there is playing crosstalk.

In this embodiment, since all the player instances which are currently in the playing state are recorded in the player instance list, it can be determined whether there is currently playing crosstalk by counting the quantity of player instances stored in the player instance list. Specifically, if the quantity of the player instances in the player instance list is greater than or equal to two, there are at least two player instances currently playing videos at the same time, interfering with each other and generating crosstalk.

S120: in response to a detection result being that there is playing crosstalk, recording abnormal playing information about a target player instance which is currently in a playing state, and reporting the abnormal playing information to a server.

The abnormal playing information includes player view tree information. The player view tree information is used for determining a service scene page where the player instance is located. When the playing crosstalk is detected, the player view tree information of each player instance causing the playing crosstalk may be recorded to locate the service scene page where these player instances are located to determine a source of an interfering sound.

Optionally, the in response to the detection result being that there is playing crosstalk, recording abnormal playing information about the target player instance which is currently in the playing state, and reporting the abnormal playing information to the server includes: in response to the detection result being that there is playing crosstalk, determining the target player instance which is currently in the playing state according to the player instance list; taking a picture rendering view of the target player instance as a starting point, traversing a whole view response chain to obtain the player view tree information about the target player instance; and reporting the player view tree information about the target player instance to the server.

In this embodiment, after the playing crosstalk is detected, at least two target player instances associated with the crosstalk may be determined according to the attribute information about the player instances recorded in the player instance list. Since each player instance has one view for rendering a video picture, i.e. a picture rendering view, which is held by a specific playing service page and then placed at a position to be displayed. For each target player instance, the whole view response chain may be traversed from the view to determine the information of the whole view tree holding the view. Each node on the view tree has a specific name, and specific service scene pages may be determined according to names of all nodes on the view tree. Illustratively, the view tree information may be: home page, gourmet channel, Chinese gourmet, Hunan cuisine, xxx dish preparation. Since each player instance will generate a piece of playing history data after the present playing ends, and report same to the server, a crosstalk notification may be sent to each target player instance, so that the target player instance generates the playing history data of the present playing according to the view tree information about each target player instance included in the crosstalk notification, and reports same to the server.

The player instance list may also be carried in the crosstalk notification and sent to the target player instance according to needs, so that the target player instance adds the player instance list to the playing history data and reports same to the server.

Note that if a user clicks on a view of the player instance and the view responds as a first responder, a view response chain with the view as the first responder may be determined. A response chain is a linked list composed of responders, a head of the linked list is the first responder, and a next node of each node of the linked list is a parent view of that node.

The technical solution provided by the embodiments of the present disclosure performs a playing crosstalk detection according to the playing state switching operation of at least one player instance; in response to a detection result being that there is playing crosstalk, abnormal playing information about a target player instance which is currently in a playing state is recorded and reported to a server, in which the abnormal playing information includes: player view tree information; and the player view tree information is used for determining a service scene page where the player instance is located, solving the problem that the crosstalk problem is difficult to troubleshoot, and realizing the function of playing crosstalk detection, and being able to quickly locate a service scene page generating crosstalk.

Figure 2:
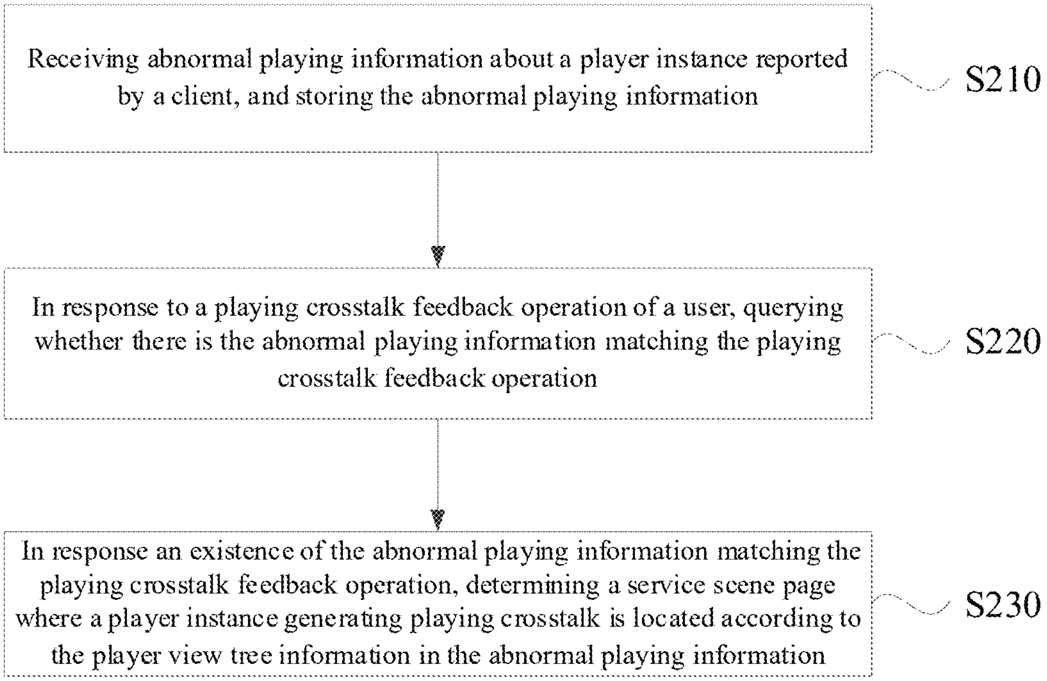
FIG. 2 is a schematic flow diagram of another method for detecting playing crosstalk according to an embodiment of the present disclosure.

FIG. 2 is a schematic flow diagram of another method for detecting playing crosstalk according to an embodiment of the present disclosure, and the embodiment of the present disclosure is applicable to a situation where a relevant problem is queried and diagnosed according to playing information about the player instance reported by a client when a user's playing crosstalk feedback is received. The method may be performed by an apparatus for detecting playing crosstalk, and the apparatus may be implemented in the form of software and/or hardware, and optionally is implemented by an electronic device, and the electronic device may be a server. Specifically, as shown in FIG. 2, the method includes:

S210: receiving abnormal playing information about a player instance reported by a client, and storing the abnormal playing information.

The abnormal playing information includes player view tree information. The player view tree information is used for determining a service scene page where the player instance is located.

In this embodiment, each player instance in the client will report a piece of playing history data to the server after finishing playing once. If playing crosstalk occurs in a player instance during this playing process, the playing history data reported thereby will also include abnormal playing information about the player instance associated with this crosstalk. The abnormal playing information is mainly player view tree information, and may also include a service scene identification of the player instance. The playing history data may further include a player instance list for storing attribute information about the player instance associated with this crosstalk. After the playing history data reported by the player instance is received, the server may directly store the playing history data, and is also possible to store only abnormal playing information contained in the playing history data for crosstalk problem query and diagnosis, and crosstalk abnormality monitoring.

S220: in response to a playing crosstalk feedback operation of a user, querying whether there is the abnormal playing information matching the playing crosstalk feedback operation.

In this embodiment, when the playing crosstalk feedback operation of the user is detected, for example, when the user clicks a crosstalk feedback button after watching a certain video, information, such as a feedback time and an identity identification of the player instance, corresponding to the playing crosstalk feedback operation is acquired. A search time period is determined according to the feedback time, for example, within 5 minutes before the feedback time, and it is queried whether there is abnormal playing information matching the identity identification of the player instance or playing history data containing the abnormal playing information within the search period.

S230: in response an existence of the abnormal playing information matching the playing crosstalk feedback operation, determining a service scene page where a player instance generating playing crosstalk is located according to the player view tree information in the abnormal playing information.

In the present embodiment, if the abnormal playing information matching the identity identification of the player instance or the playing history data containing the abnormal playing information is found within the search time period, the player instance is considered to be interfered with crosstalk by abnormal playing of other service scenes during playing. At this time, the service scene page where each player instance generating the playing crosstalk is located may be determined by analyzing the player view tree information in the abnormal playing information.

Optionally, the method further includes: periodically counting crosstalk occurrence probability; in response to the crosstalk occurrence probability of a target period being greater than a specified threshold value, performing cluster sorting on the player view tree information in the target period, and sequentially acquiring a pre-set amount of the player view tree information as crosstalk abnormality information; and taking a service scene page corresponding to the crosstalk abnormality information as a crosstalk abnormality page and feeding the crosstalk abnormality page back to relevant service parties.

In this embodiment, in order to monitor the overall change of the playing crosstalk, one crosstalk monitoring index, called crosstalk occurrence probability, is defined for the client. The crosstalk occurrence probability is a ratio of the quantity of times of playing in which the playing crosstalk occurs in one period to a total quantity of times of playing. By counting the collected abnormal playing information, an average probability value of crosstalk occurring within one period is determined, and the average probability value may be used as a specified threshold value. The crosstalk occurrence probability in each period is calculated, and the fluctuation of the index is monitored by comparing the crosstalk occurrence probability in each period with the specified threshold. In response to the crosstalk occurrence probability of a certain period being greater than the specified threshold value, for example, greater than 0.5, then it is considered that the crosstalk occurrence probability within the period increases greatly; and by analyzing abnormal playing information corresponding to the period or playing history data containing the abnormal playing information, player view tree information about the player instances associated with the crosstalk is clustered and arranged, and a pre-set amount of player view tree information is sequentially acquired as the crosstalk abnormality information which causes more interference. According to the names of all the nodes on the view tree in each crosstalk abnormality information, an abnormal service scene page is determined and fed back to relevant business parties in time, so that the relevant business parties can adjust the abnormal scene page to reduce the occurrence of crosstalk.

In the technical solution provided by the embodiments of the present disclosure, abnormal playing information about a player instance reported by a client is received, and the abnormal playing information is stored; and the abnormal playing information includes player view tree information; in response to a playing crosstalk feedback operation of the user, it is queried whether there is the abnormal playing information matching the playing crosstalk feedback operation; and if there is, a service scene page where the player instance generating the playing crosstalk is located is determined according to the player view tree information in the abnormal playing information, solving the problem that the crosstalk problem is difficult to troubleshoot, realizing the function of querying and diagnosing the crosstalk problem, and being able to quickly locate the service scene page generating the crosstalk.

Figure 3:
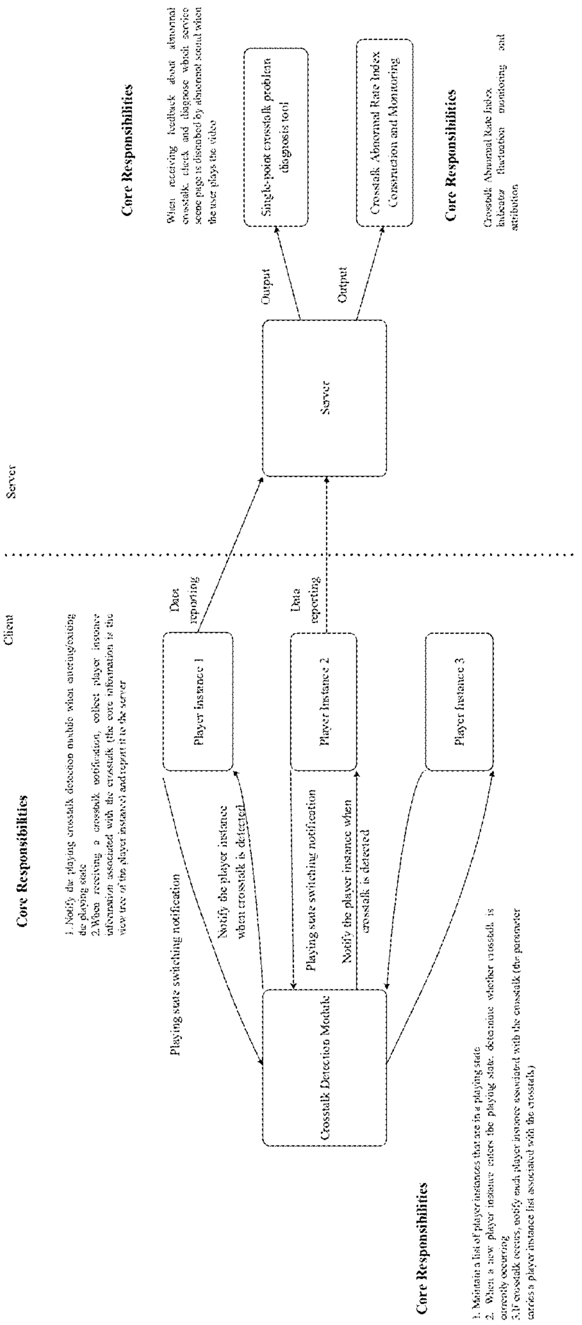
FIG. 3 is a detection and monitoring flow diagram for playing crosstalk according to an embodiment of the present disclosure.

FIG. 3 is a detection and monitoring flow diagram for playing crosstalk according to an embodiment of the present disclosure, and as shown in FIG. 3, a playing crosstalk detection module is provided in the client, and the module is a single instance for managing the player instance which is currently in the playing state and core logic for performing a playing crosstalk detection. The method includes that:

1) The client updates the player instance list according to the playing state switching operation of at least one player instance.

In this embodiment, the player instance notifies the playing crosstalk detection module when entering or exiting the playing state. The playing crosstalk detection module maintains the player instance list in the playing state according to the notification message. Specifically, when one player instance enters the playing state, the playing crosstalk detection module will record the attribute information about the player instance into the player instance list, and when one player instance exits the playing state, the attribute information about the player instance will be removed from the player instance list.

2) If the client determines that a new player instance enters the playing state, the playing crosstalk detection is performed according to the player instance list.

In this embodiment, the quantity of player instances stored in the player instance list may be counted, and if the quantity of player instances in the player instance list is greater than or equal to two, at least two player instances currently play videos at the same time, and it is considered that playing crosstalk currently occurs.

3) If the client detects the playing crosstalk, abnormal playing information about each player instance currently in the playing state is recorded and reported to the server.

In this embodiment, the abnormal playing information may include player view tree information about each player instance associated with crosstalk for determining the service scene page where the player instance is located, and if the player instance is configured with a service scene identification, the service scene identification may also be included in the abnormal playing information. For each player instance, when the present playing ends, a piece of playing history data is generated according to information related to the present playing and reported to the server. Therefore, the playing crosstalk detection module may send a crosstalk notification to each player instance associated with the crosstalk after detecting the occurrence of playing crosstalk and recording the abnormal playing information about the player instance associated with the crosstalk, and carry the abnormal playing information about the player instance associated with the crosstalk in the notification message. The player instance generates playing history data according to the received abnormal playing information and in combination with relevant information about the present playing, such as playing time, client identification, identity identification of the player instance, and sends same to the server for storage.

4) When the crosstalk feedback of the user is received, the server queries whether there is abnormal playing information matching the playing crosstalk feedback, and if so, the server determines a crosstalk diagnosis result according to the player view tree information in the abnormal playing information, and returns same to the user.

In this embodiment, after receiving the crosstalk feedback of the user, the server determines the feedback time and the player instance, and queries whether there is the abnormal playing information matching the identity identification of the player instance or playing history data containing the abnormal playing information within a period of time near the feedback time. If the abnormal playing information meeting the condition is found, then the player view tree information in the abnormal playing information is analyzed to provide a diagnosis result: the crosstalk occurs in the present playing, and the service scene page where each player instance generating the playing crosstalk is located is given.

5) The server monitors and analyzes the occurrence of the playing crosstalk according to the collected abnormal playing information of the player instance.

In this embodiment, the server sets a crosstalk occurrence probability index for the client, and a statistical aperture of the index is: a ratio of the quantity of times of playing in which the playing crosstalk occurs to a total quantity of times of playing within one period. The fluctuation of the index is monitored on-line. If it is found that the crosstalk occurrence probability of a certain period increases greatly, by analyzing the abnormal playing information or the playing history data containing the abnormal playing information in this time period, the view tree information about the player instance associated with the crosstalk is clustered and ranked, and which service scene page has abnormality is analyzed, so as to timely feed the information back to relevant service parties and perform page adjustment.

Figure 4:
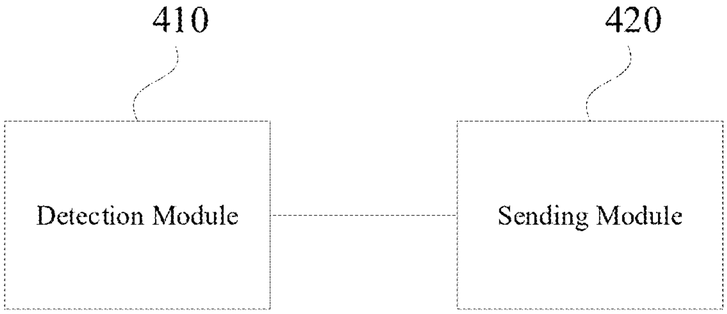
FIG. 4 is a schematic structural diagram of an apparatus for detecting playing crosstalk according to an embodiment of the present disclosure.

FIG. 4 is a schematic flow diagram of an apparatus for detecting playing crosstalk according to an embodiment of the present disclosure, and as shown in FIG. 4, the apparatus includes: a detection module 410 and a sending module 420.

The detection module 410 is configured to perform a playing crosstalk detection according to a playing state switching operation of at least one player instance; and the sending module 420 is configured to, in response to a detection result being that there is playing crosstalk, record abnormal playing information about a target player instance which is currently in a playing state, and report the abnormal playing information to a server, in which the abnormal playing information includes: player view tree information; and the player view tree information is used for determining a service scene page where the player instance is located.

The technical solution provided by the embodiments of the present disclosure performs a playing crosstalk detection according to the playing state switching operation of at least one player instance; in response to a detection result being that there is playing crosstalk, abnormal playing information about a target player instance which is currently in a playing state is recorded and reported to a server, in which the abnormal playing information includes: player view tree information; and the player view tree information is used for determining a service scene page where the player instance is located, solving the problem of difficulty in checking a crosstalk problem, and realizing the function of playing crosstalk detection, and being able to quickly locate a service scene page generating crosstalk.

In the above-mentioned aspect, the detection module 410 includes:

a list updating unit configured to update a player instance list according to the playing state switching operation of the at least one player instance; and a crosstalk detection unit configured to, in response to a player instance entering the playing state, perform the playing crosstalk detection according to the player instance list.

In the above-mentioned solution, the list updating unit may be used for, in response to the player instance exiting the playing state, deleting attribute information about the player instance from the player instance list; and in response to the player instance entering the playing state, adding attribute information about the player instance to the player instance list; and a crosstalk detection unit which can be configured to, in response to the attribute information about at least two player instances being contained in the player instance list, determine that there is playing crosstalk.

In the above-mentioned solution, the sending module 420 is configured to:

in response to the detection result being that there is the playing crosstalk, determine the target player instance which is currently in the playing state according to the player instance list;

take a picture rendering view of the target player instance as a starting point, traversing a whole view response chain to obtain the player view tree information about the target player instance; and report the player view tree information about the target player instance to the server.

The apparatus for detecting playing crosstalk provided by an embodiment of the present disclosure can execute the method for detecting playing crosstalk applicable in a client provided by any embodiment of the present disclosure, and has functional modules and beneficial effects corresponding to performing the method.

It should be noted that in the above-mentioned apparatus, the various units and modules included are merely divided according to functional logic, but are not limited to the above-mentioned division, as long as corresponding functions can be realized; in addition, the specific names of each functional unit are merely taken for facilitating mutual distinction, and are not intended to limit the scope of protection of the embodiments of the present disclosure.

Figure 5:
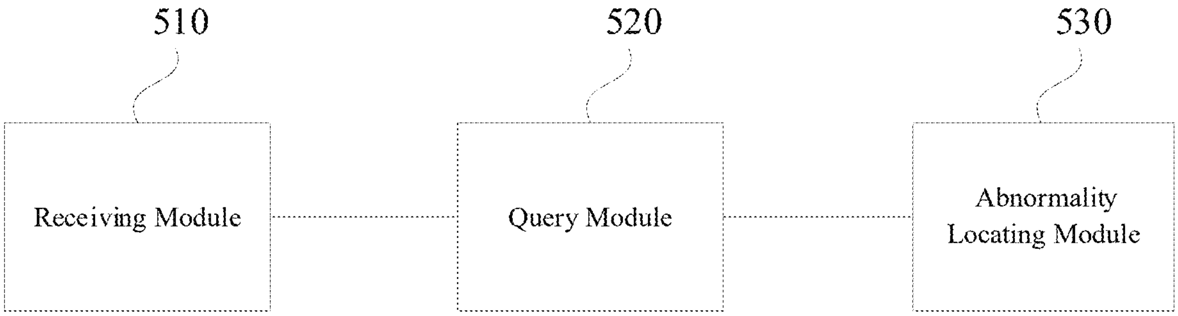
FIG. 5 is a schematic flow diagram of another apparatus for detecting playing crosstalk according to an embodiment of the present disclosure.

FIG. 5 is a schematic flow diagram of another apparatus for detecting playing crosstalk according to an embodiment of the present disclosure, and as shown in FIG. 5, the apparatus includes: a receiving module 510, a query module 520 and an abnormality locating module 530.

The receiving module 510 is configured to receive abnormal playing information about a player instance reported by a client, and store the abnormal playing information; and the abnormal playing information including: player view tree information;

the query module 520 is configured to, in response to a playing crosstalk feedback operation of a user, query whether there is the abnormal playing information matching the playing crosstalk feedback operation; and the abnormality locating module 530 is configured to, in response an existence of the abnormal playing information matching the playing crosstalk feedback operation, determine a service scene page where a target player instance generating playing crosstalk is located according to the player view tree information in the abnormal playing information.

In the technical solution provided by the embodiments of the present disclosure, abnormal playing information about a player instance reported by a client is received, and the abnormal playing information is stored; and the abnormal playing information includes: player view tree information; in response to a playing crosstalk feedback operation of the user, it is queried whether there is the abnormal playing information matching the playing crosstalk feedback operation; and; and if there is, a service scene page where the player instance generating the playing crosstalk is located is determined according to the player view tree information in the abnormal playing information, solving the problem that the crosstalk problem is difficult to troubleshoot, realizing the function of querying and diagnosing the crosstalk problem, and being able to quickly locate the service scene page generating the crosstalk.

Further, the apparatus for detecting playing crosstalk provided in the present embodiment may further include:

a crosstalk abnormality monitoring module configured to periodically count crosstalk occurrence probability; and in response to the crosstalk occurrence probability of a target period being greater than a specified threshold value, perform cluster sorting on the player view tree information in the target period, and sequentially acquire a pre-set amount of the player view tree information as crosstalk abnormality information; and take a service scene page corresponding to the crosstalk abnormality information as a crosstalk abnormality page and feed the crosstalk abnormality page back to relevant service parties.

The apparatus for detecting playing crosstalk provided by an embodiment of the present disclosure can execute the method for detecting playing crosstalk applicable in a server provided by any embodiment of the present disclosure, and has functional modules and beneficial effects corresponding to performing the method.

It should be noted that in the above-mentioned apparatus, the various units and modules included are merely divided according to functional logic, but are not limited to the above-mentioned division, as long as corresponding functions can be realized; in addition, the specific names of each functional unit are merely taken for facilitating mutual distinction, and are not intended to limit the scope of protection of the embodiments of the present disclosure.

Figure 6:
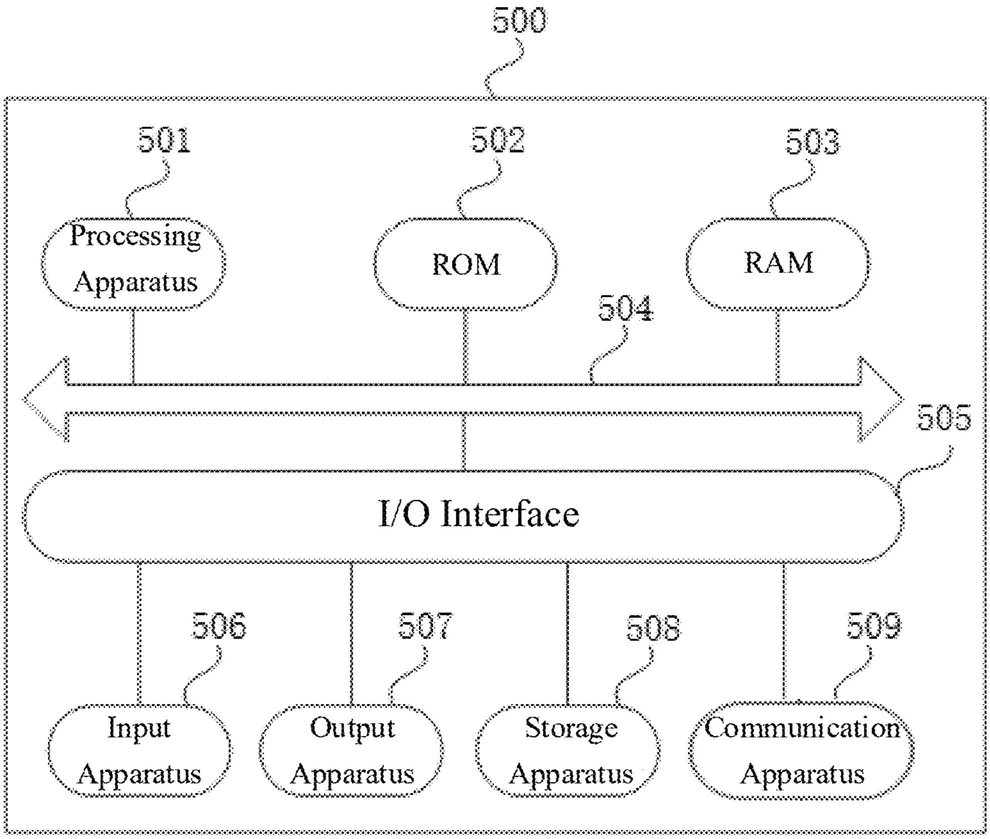
FIG. 6 is a schematic structural diagram of an electronic device according to an embodiment of the present disclosure.

FIG. 6 is a schematic structural diagram of an electronic device according to an embodiment of the present disclosure. Referring to FIG. 6, FIG. 6 illustrates a schematic structural diagram of an electronic device 500 (For example, the client device or server in FIG. 6) suitable for implementing the embodiments of the present disclosure. The terminal devices in the embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal) or the like, and fixed terminals such as a digital TV, a desktop computer, or the like. The electronic device illustrated in FIG. 6 is merely an example, and should not pose any limitation to the functions and the range of use of the embodiments of the present disclosure.

As illustrated in FIG. 6, the electronic device 500 may include a processing apparatus 501 (e.g., a central processing unit, a graphics processing unit, etc.), which can perform various suitable actions and processing according to a program stored in a read-only memory (ROM) 502 or a program loaded from a storage apparatus 508 into a random-access memory (RAM) 503. The RAM 503 further stores various programs and data required for operations of the electronic device 500. The processing apparatus 501, the ROM 502, and the RAM 503 are interconnected through a bus 504. An input/output (I/O) interface 505 is also connected to the bus 504.

Usually, the following apparatuses may be connected to the I/O interface 505: an input apparatus 506 including, for example, a touch screen, a touch pad, a keyboard, a mouse, a camera, a microphone, an accelerometer, a gyroscope, or the like; an output apparatus 507 including, for example, a liquid crystal display (LCD), a loudspeaker, a vibrator, or the like; a storage apparatus 508 including, for example, a magnetic tape, a hard disk, or the like; and a communication apparatus 509. The communication apparatus 509 may allow the electronic device 500 to be in wireless or wired communication with other devices to exchange data. While FIG. 6 illustrates the electronic device 500 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 509 and installed, or may be installed from the storage apparatus 508, or may be installed from the ROM 502. When the computer program is executed by the processing apparatus 501, the above-mentioned functions defined in the methods of some embodiments of the present disclosure are performed.

The names of the messages or information exchanged between a plurality of apparatuses in the embodiments of the present disclosure are for illustrative purposes only and are not intended to limit the scope of these messages or information.

The electronic device provided in embodiments of the present disclosure belongs to the same inventive concept as the method for detecting playing crosstalk provided in the above embodiment. Technical details not described in detail in this embodiment can be found in the above embodiment, and this embodiment has the same beneficial effects as the above embodiment.

The embodiment of the present disclosure provides a computer storage medium on which a computer program is stored. When the program is executed by a processor, it implements the method for detecting playing crosstalk provided in the above embodiment.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: perform a playing crosstalk detection according to a playing state switching operation of at least one player instance; in response to a detection result being that there is playing crosstalk, record abnormal playing information about a target player instance which is currently in a playing state, and report the abnormal playing information to a server, in which the abnormal playing information includes player view tree information; and the player view tree information is used for determining a service scene page where the player instance is located.

Alternatively, the above-mentioned computer-readable medium carries one or more programs, and when the one or more programs are executed by the electronic device, the electronic device is caused to: receive abnormal playing information about a player instance reported by a client, and store the abnormal playing information; in which the abnormal playing information includes player view tree information; in response to a playing crosstalk feedback operation of a user, query whether there is the abnormal playing information matching the playing crosstalk feedback operation; and in response an existence of the abnormal playing information matching the playing crosstalk feedback operation, determine a service scene page where a target player instance generating playing crosstalk is located according to the player view tree information in the abnormal playing information.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the unit does not constitute a limitation of the unit itself under certain circumstances. For example, a list updating unit may also be described as "a unit of updating a player instance list according to the playing state switching operation of the at least one player instance".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, example 1 provides a method for detecting playing crosstalk, applicable in a client, including:

performing a playing crosstalk detection according to a playing state switching operation of at least one player instance; and in response to a detection result being that there is playing crosstalk, recording abnormal playing information about a target player instance which is currently in a playing state, and reporting the abnormal playing information to a server, in which the abnormal playing information includes player view tree information; and the player view tree information is used for determining a service scene page where the player instance is located.

According to one or more embodiments of the present disclosure, example 2 according to the method of the example 1, in which the performing the playing crosstalk detection according to the playing state switching operation of at least one player instance includes:

updating a player instance list according to the playing state switching operation of the at least one player instance; and in response to a player instance entering the playing state, performing the playing crosstalk detection according to the player instance list.

According to one or more embodiments of the present disclosure, example 3 according to the method of the example 2, in which the updating the player instance list according to the playing state switching operation of the at least one player instance includes:

in response to the player instance exiting the playing state, deleting attribute information about the player instance from the player instance list;

in response to the player instance entering the playing state, adding attribute information about the player instance to the player instance list; and the performing the playing crosstalk detection according to the player instance list including:

in response to the attribute information about at least two player instances being contained in the player instance list, determining that there is playing crosstalk.

According to one or more embodiments of the present disclosure, example 4 according to the method of the example 1, in which in response to the detection result being that there is playing crosstalk, recording abnormal playing information about the target player instance which is currently in the playing state, and reporting the abnormal playing information to the server includes:

in response to the detection result being that there is the playing crosstalk, determining the target player instance which is currently in the playing state according to the player instance list;

taking a picture rendering view of the target player instance as a starting point, traversing a whole view response chain to obtain the player view tree information about the target player instance; and reporting the player view tree information about the target player instance to the server.

According to one or more embodiments of the present disclosure, example 5 provides a method for detecting playing crosstalk, applicable in a server, including:

receiving abnormal playing information about a player instance reported by a client, and storing the abnormal playing information; in which the abnormal playing information includes player view tree information;

in response to a playing crosstalk feedback operation of a user, querying whether there is the abnormal playing information matching the playing crosstalk feedback operation; and in response an existence of the abnormal playing information matching the playing crosstalk feedback operation, determining a service scene page where a player instance generating playing crosstalk is located according to the player view tree information in the abnormal playing information.

According to one or more embodiments of the present disclosure, example 6 according to the method of the example 5, further including:

periodically counting crosstalk occurrence probability;

in response to the crosstalk occurrence probability of a target period being greater than a specified threshold value, performing cluster sorting on the player view tree information in the target period, and sequentially acquiring a pre-set amount of the player view tree information as crosstalk abnormality information; and taking a service scene page corresponding to the crosstalk abnormality information as a crosstalk abnormality page and feeding the crosstalk abnormality page back to relevant service parties.

According to one or more embodiments of the present disclosure, example 7 provides an apparatus for detecting playing crosstalk, applicable in a client, including:

a detection module, configured to perform a playing crosstalk detection according to a playing state switching operation of at least one player instance; and a sending module, configured to, in response to a detection result being that there is playing crosstalk, record abnormal playing information about a target player instance which is currently in a playing state, and report the abnormal playing information to a server, in which the abnormal playing information includes player view tree information; and the player view tree information is used for determining a service scene page where the player instance is located.

According to one or more embodiments of the present disclosure, example 8 provides an apparatus for detecting playing crosstalk, applicable in a server, including:

a receiving module, configured to receive abnormal playing information about a player instance reported by a client, and store the abnormal playing information; in which the abnormal playing information includes player view tree information;

a query module configured to, in response to a playing crosstalk feedback operation of a user, query whether there is the abnormal playing information matching the playing crosstalk feedback operation; and an abnormality locating module configured to, in response an existence of the abnormal playing information matching the playing crosstalk feedback operation, determine a service scene page where a target player instance generating playing crosstalk is located according to the player view tree information in the abnormal playing information.

According to one or more embodiments of the present disclosure, example 9 provides an electronic device, including:

one or more processors; and a storage apparatus for storing one or more programs, in which when the one or more programs are executed by the one or more processors, the one or more processors implement the method for detecting playing crosstalk according to any one of examples 1-4 or the method for detecting playing crosstalk according to any one of examples 5-6.

According to one or more embodiments of the present disclosure, example 10 provides a storage medium containing computer-executable instructions, in which the computer-executable instructions, when executed by a computer processor, perform the method for detecting playing crosstalk according to any one of examples 1-4 or the method for detecting playing crosstalk according to any one of examples 5-6.

The above descriptions are merely preferred embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. A method for detecting playing crosstalk, applicable in a client, comprising:

performing a playing crosstalk detection according to a playing state switching operation of at least one player instance; and in response to a detection result being that there is playing crosstalk, recording abnormal playing information about a first player instance which is currently in a playing state, and reporting the abnormal playing information to a server, wherein the abnormal playing information comprises player view tree information; and the player view tree information is used for determining a service scene page where the first player instance is located.

2. The method for detecting playing crosstalk according to claim 1, wherein the performing the playing crosstalk detection according to the playing state switching operation of at least one player instance comprises:

updating a player instance list according to the playing state switching operation of the at least one player instance; and in response to a player instance entering the playing state, performing the playing crosstalk detection according to the player instance list.

3. The method for detecting playing crosstalk according to claim 2, wherein the updating the player instance list according to the playing state switching operation of the at least one player instance comprises:

in response to the player instance exiting the playing state, deleting attribute information about the player instance from the player instance list;

in response to the player instance entering the playing state, adding attribute information about the player instance to the player instance list; and the performing the playing crosstalk detection according to the player instance list comprises:

in response to attribute information about at least two player instances being contained in the player instance list, determining that there is playing crosstalk.

4. The method for detecting playing crosstalk according to claim 2, wherein in response to the detection result being that there is playing crosstalk, recording abnormal playing information about the first player instance which is currently in the playing state, and reporting the abnormal playing information to the server comprises:

in response to the detection result being that there is the playing crosstalk, determining the first player instance which is currently in the playing state according to the player instance list;

taking a picture rendering view of the first player instance as a starting point, traversing a whole view response chain to obtain the player view tree information about the first player instance; and reporting the player view tree information about the first player instance to the server.

5. A method for detecting playing crosstalk, applicable in a server, comprising:

receiving abnormal playing information about a player instance reported by a client, and storing the abnormal playing information; wherein the abnormal playing information comprises player view tree information;

in response to a playing crosstalk feedback operation of a user, querying whether there is the abnormal playing information matching the playing crosstalk feedback operation; and in response an existence of the abnormal playing information matching the playing crosstalk feedback operation, determining a service scene page where a player instance generating playing crosstalk is located according to the player view tree information in the abnormal playing information.

6. The method for detecting playing crosstalk according to claim 5, further comprising:

periodically counting crosstalk occurrence probability;

in response to the crosstalk occurrence probability of a first period being greater than a specified threshold value, performing cluster sorting on the player view tree information in the first period, and sequentially acquiring a pre-set amount of the player view tree information as crosstalk abnormality information; and taking a service scene page corresponding to the crosstalk abnormality information as a crosstalk abnormality page and feeding the crosstalk abnormality page back to relevant service parties.

7. An electronic device, comprising:

one or more processors; and a storage apparatus for storing one or more programs, wherein when the one or more programs are executed by the one or more processors, the one or more processors implement a method for detecting playing crosstalk, wherein the method comprises:

performing a playing crosstalk detection according to a playing state switching operation of at least one player instance; and in response to a detection result being that there is playing crosstalk, recording abnormal playing information about a first player instance which is currently in a playing state, and reporting the abnormal playing information to a server, wherein the abnormal playing information comprises player view tree information; and the player view tree information is used for determining a service scene page where the first player instance is located.

8. A non-transitory storage medium containing computer-executable instructions, wherein the computer-executable instructions, when executed by a computer processor, perform the method for detecting playing crosstalk according to claim 1.

9. The electronic device according to claim 7, wherein the performing the playing crosstalk detection according to the playing state switching operation of at least one player instance comprises:

updating a player instance list according to the playing state switching operation of the at least one player instance; and in response to a player instance entering the playing state, performing the playing crosstalk detection according to the player instance list.

10. The electronic device according to claim 9, wherein the updating the player instance list according to the playing state switching operation of the at least one player instance comprises:

in response to the player instance exiting the playing state, deleting attribute information about the player instance from the player instance list;

in response to the player instance entering the playing state, adding attribute information about the player instance to the player instance list; and the performing the playing crosstalk detection according to the player instance list comprises:

in response to attribute information about at least two player instances being contained in the player instance list, determining that there is playing crosstalk.

11. The electronic device according to claim 9, wherein in response to the detection result being that there is playing crosstalk, recording abnormal playing information about the first player instance which is currently in the playing state, and reporting the abnormal playing information to the server comprises:

in response to the detection result being that there is the playing crosstalk, determining the first player instance which is currently in the playing state according to the player instance list;

taking a picture rendering view of the first player instance as a starting point, traversing a whole view response chain to obtain the player view tree information about the first player instance; and reporting the player view tree information about the first player instance to the server.

12. An electronic device, comprising:

one or more processors; and a storage apparatus for storing one or more programs, wherein when the one or more programs are executed by the one or more processors, the one or more processors implement the method for detecting playing crosstalk according to claim 5.

13. The electronic device according to claim 12, wherein the method further comprises:

periodically counting crosstalk occurrence probability;

in response to the crosstalk occurrence probability of a first period being greater than a specified threshold value, performing cluster sorting on the player view tree information in the first period, and sequentially acquiring a pre-set amount of the player view tree information as crosstalk abnormality information; and taking a service scene page corresponding to the crosstalk abnormality information as a crosstalk abnormality page and feeding the crosstalk abnormality page back to relevant service parties.

14. The non-transitory storage medium according to claim 8, wherein the performing the playing crosstalk detection according to the playing state switching operation of at least one player instance comprises:

updating a player instance list according to the playing state switching operation of the at least one player instance; and in response to a player instance entering the playing state, performing the playing crosstalk detection according to the player instance list.

15. The non-transitory storage medium according to claim 14, wherein the updating the player instance list according to the playing state switching operation of the at least one player instance comprises:

in response to the player instance exiting the playing state, deleting attribute information about the player instance from the player instance list;

in response to the player instance entering the playing state, adding attribute information about the player instance to the player instance list; and the performing the playing crosstalk detection according to the player instance list comprises:

in response to attribute information about at least two player instances being contained in the player instance list, determining that there is playing crosstalk.

16. The non-transitory storage medium according to claim 14, wherein in response to the detection result being that there is playing crosstalk, recording abnormal playing information about the first player instance which is currently in the playing state, and reporting the abnormal playing information to the server comprises:

in response to the detection result being that there is the playing crosstalk, determining the first player instance which is currently in the playing state according to the player instance list;

taking a picture rendering view of the first player instance as a starting point, traversing a whole view response chain to obtain the player view tree information about the first player instance; and reporting the player view tree information about the first player instance to the server.

17. A non-transitory storage medium containing computer-executable instructions, wherein the computer-executable instructions, when executed by a computer processor, perform the method for detecting playing crosstalk according to claim 5.

18. The non-transitory storage medium according to claim 17, wherein the method further comprises:

periodically counting crosstalk occurrence probability;

in response to the crosstalk occurrence probability of a first period being greater than a specified threshold value, performing cluster sorting on the player view tree information in the first period, and sequentially acquiring a pre-set amount of the player view tree information as crosstalk abnormality information; and taking a service scene page corresponding to the crosstalk abnormality information as a crosstalk abnormality page and feeding the crosstalk abnormality page back to relevant service parties.

* * * * *